United States Patent

Wagner

[11] Patent Number: 5,920,957
[45] Date of Patent: Jul. 13, 1999

[54] HAND GRIP MADE OF PLASTIC

[75] Inventor: Jörg Wagner, Kaiserslautern, Germany

[73] Assignee: TRW United-Carr GmbH & Co. KG, Germany

[21] Appl. No.: 08/824,370

[22] Filed: Mar. 25, 1997

[30] Foreign Application Priority Data

Mar. 25, 1996 [DE] Germany .......................... 196 11 724

[51] Int. Cl.⁶ ........................................................ B60N 3/02
[52] U.S. Cl. .............................. 16/112; 16/114 R; 16/126; 411/45; 411/60; 296/214
[58] Field of Search ............................ 16/110 R, 114 R, 16/383, DIG. 22, DIG. 24, DIG. 40; 403/315, 326; 220/759, 776; 24/297, 453; 400/41, 45, 48, 60; 296/214

[56] References Cited

U.S. PATENT DOCUMENTS

| 2,282,412 | 5/1942 | Wallace | 16/111 R |
|---|---|---|---|
| 3,204,286 | 9/1965 | Hillenbrand | 16/112 |
| 4,981,322 | 1/1991 | Dowd et al. | 411/45 |
| 5,662,375 | 9/1997 | Adams et al. | 16/110 R |

FOREIGN PATENT DOCUMENTS

| 0 356 919 | 3/1990 | European Pat. Off. | 16/126 |
|---|---|---|---|
| 0 507 082 A1 | 10/1992 | European Pat. Off. | |
| 0 616 920 A1 | 9/1994 | European Pat. Off. | 16/110 R |
| 2428540 | 11/1980 | France | 16/110 R |
| 29 06 288 B1 | 8/1980 | Germany . | |
| 37 26 031 A1 | 2/1988 | Germany . | |
| 38 29 209 A1 | 3/1990 | Germany . | |
| 42 44 484 A1 | 7/1994 | Germany . | |
| 94 07 276 | 8/1994 | Germany . | |
| 43 09 024 A1 | 9/1994 | Germany . | |
| 93 20 677 U1 | 1/1995 | Germany . | |
| 4-300741 | 10/1992 | Japan | 16/110 R |
| 5-149 359 | 6/1993 | Japan . | |
| 5-164 169 | 6/1993 | Japan . | |
| WO 96/17178 | 6/1996 | WIPO | 16/110 R |

Primary Examiner—Anthony Knight
Assistant Examiner—Donald M. Gurley
Attorney, Agent, or Firm—Fay, Sharpe, Beall, Fagan, Minnich & McKee, LLP

[57] ABSTRACT

The invention relates to a plastic hand grip 1 having two end zones respectively attachable in a support opening 5 by means of a connecting part. Each connecting part 3 has at least one locking zone adapted to grasp behind the support opening 5 and to be held therein in a spread position. The connecting part 3 has two oppositely facing connecting flanges 10, 11. One connecting flange 11 is resilient and the other connecting flange 10 is rigid. In closed position, the resilient connecting flange 11 is held in the spread position S by means of a secured arresting bolt 15. The connecting part below the two contact flanges 10, 11 is provided with two locations, arranged at a distance from each other, for a spring-loaded hinge bolt 20 for penetrating the end zones of the tiltably designed hand grip 1.

12 Claims, 3 Drawing Sheets

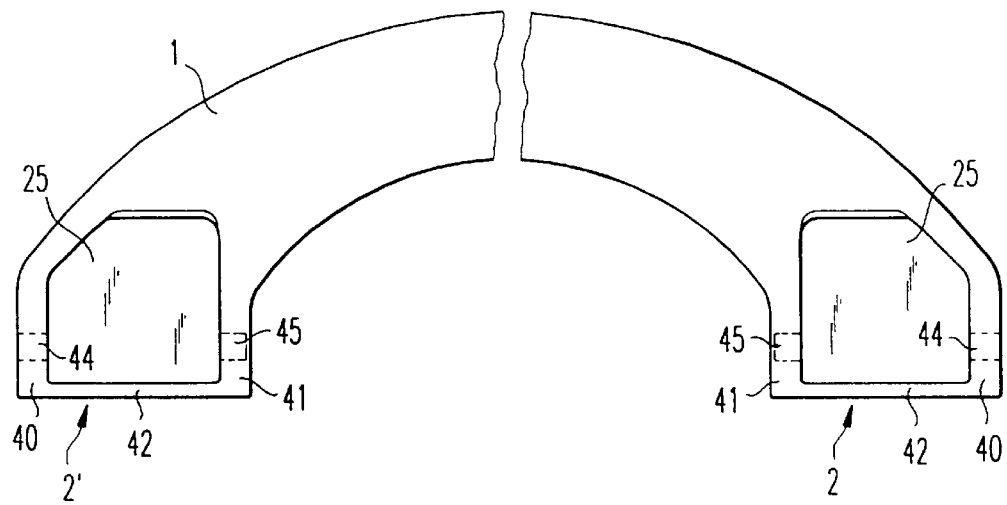
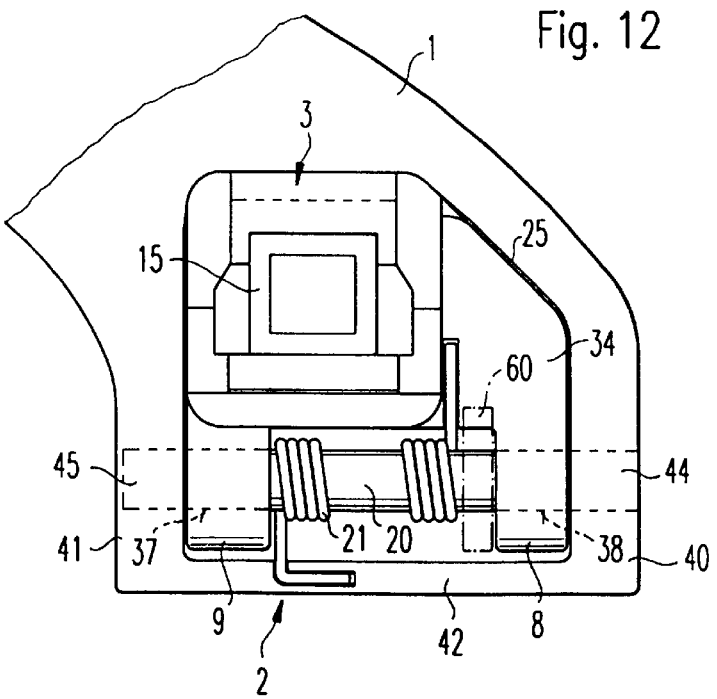

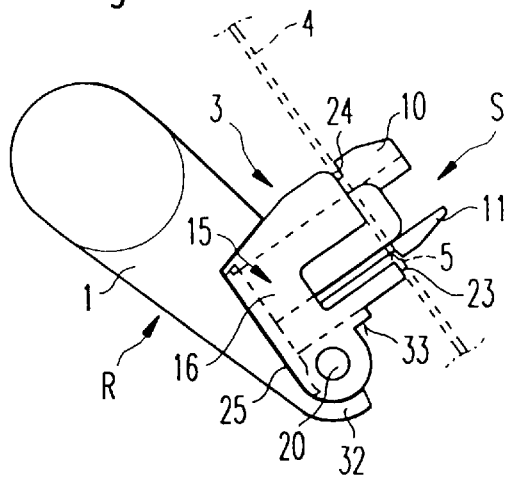
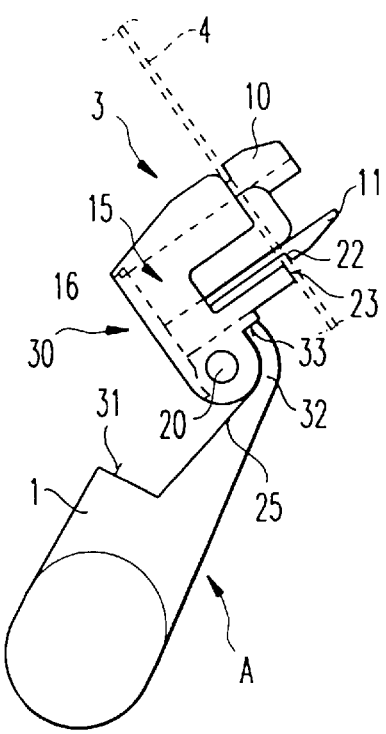
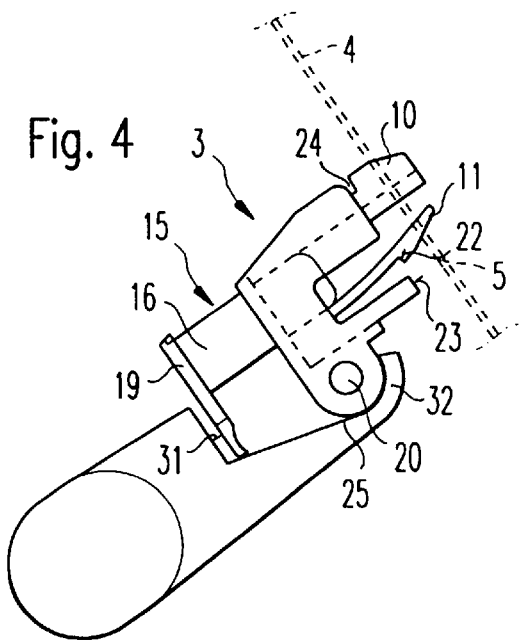
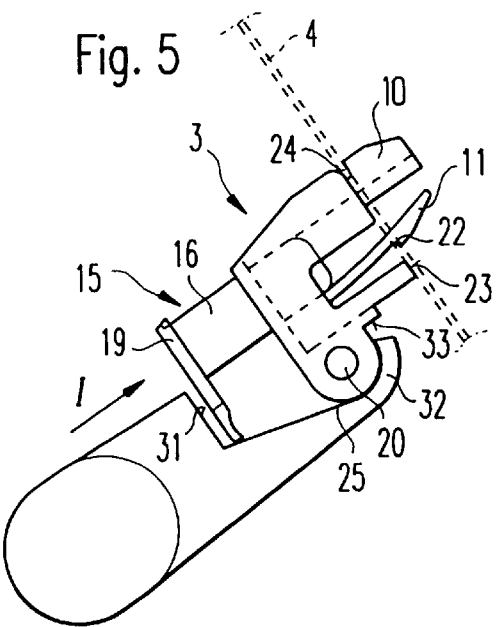

HAND GRIP MADE OF PLASTIC

BACKGROUND OF THE INVENTION

The invention relates to a plastic hand grip having two end zones that are each attachable in a support opening by means of a hinge part. Each hinge part has at least one locking zone which grasps behind the support opening and is held in a spread or locking position.

A hand grip of this type is already known in the general state of the art which is, for example, attachable to the body of a motor vehicle. From a structural and spatial aspect, this construction is expensive.

In contract thereto, it is the object of the present invention to create a hand grip of the initially mentioned kind which is of simple construction, occupies little space, and can be rapidly installed.

SUMMARY OF THE INVENTION

This object is achieved according to the invention in that the hinge part has a locking zone including two contact flanges positioned in opposition to each other. One contact flange is elastically constructed, and the other contact flange is rigid. The elastic contact flange is held in a spread position through a secured arrest bolt. The flanges grasp behind the support opening and the hinge part below the two contact flanges is equipped with two hinge locations arranged at a distance from each other for a spring-loaded hinge bolt which penetrates the end zones of the, at least in part, tiltably designed hand grip.

The result of this specially designed hand grip is rapid execution of the installation process. In addition, due to the tiltable design of the hand grip, the hand grip occupies only little space in position of rest or non-use.

In further embodiment of the invention, the elastic contact flange may be arranged below the rigid contact flange. The hinge part, arranged opposite a contact shoulder of the elastic contact flange, has a contact surface abutting the support in position of rest, and the rigid contact flange is equipped at the end side with a groove adapted to the thickness of the support. Thus, the hinge part can be pushed through the support opening and secured with the aid of the arrest bolt. The arrest bolt acts, respectively, internally upon the rigid flange as well as the elastic contact flange.

In further embodiment of the invention, the hinge part can have, on the side facing away from the contact elements and coverable by the respective end zone, at least one arresting zone for limiting rotary movement of the hand grip. In this arrangement, each end zone of the hand grip can have an arresting zone, an upper stop, and a lower stop of convex shape located in the area of the hinge locations. The lower stop frontally acts upon a counter surface of the storage part with the hand grip in a raised position.

In further embodiment of the invention, each end zone of the hand grip can be fitted with a recess into which can be accepted the posterior zone of the respective hinge part fitted with the arresting zone. The recess can pass over into the convex stop zone whose frontal surface acts upon the counter surface of the storage part with the hand grip raised. Thus, the recess serves a dual function, namely (a) to accept an area of the hinge part and (b) to limit the stop surface for the swivel movement of the hand grip.

According to another characteristic of the invention, the hinge part can have, between the elastic and the rigid contact flange, a rectangular passage opening for receiving the rectangular main body of the arresting bolt. In this configuration, the end of the main body can be equipped with a cover plate adjacent to the posterior zone of the storage part. Each long side of the main body can be provided with an elastic stop tongue embeddable in an arresting device of the hinge part. The arresting tongues positioned opposite each other can have different lengths. It is possible, with the aid of these arresting tongues, to make the hinge part functionally secure in a spread position within a support opening and thus, together, fasten the hand grip functionally secure to the support.

Still other advantages and benefits of the invention will become apparent to those skilled in the art upon a reading and understanding of the following detailed description.

BRIEF DESCRIPTION OF THE DRAWINGS

In the following, the invention is described in more detail based on an exemplary embodiment shown in the drawings wherein:

FIG. 1 is a front view of the hand grip, in part refracted;

FIGS. 2 and 3 are schematic lateral views each showing the hand grip attached to a support, but in resting and in folded-up positions, respectively;

FIGS. 4 and 5 are schematic lateral views showing two process steps for attaching the hand grip to a support with the aid of contact elements;

FIG. 12 is an enlarged view of an end zone of the hand grip according to FIG. 1 in built-in state, partially refracted.

DETAILED DESCRIPTION OF THE PREFERRED EMBODIMENT

Figure 6:
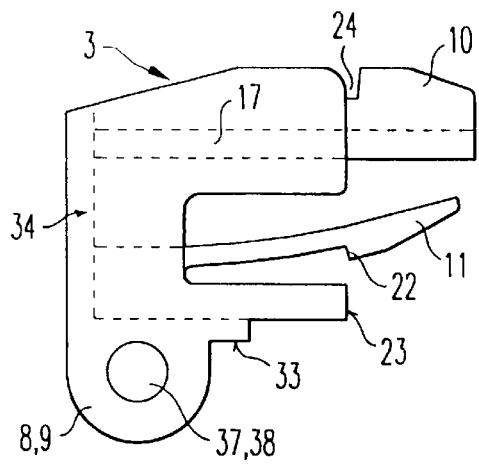
FIG. 6 is a lateral view of the hinge part.

Referring now to the drawings wherein the showings are for the purposes of illustrating the preferred embodiment of the invention only and not for purposes of limiting same, FIG. 1 depicts a hand grip 1 made of plastic which has two end zones 2 and 2' which are each provided with a recess 25. Each recess 25 is respectively limited on both sides by lateral walls 40, 41 connected with each other by another cross piece 42.

In this configuration according to FIG. 12, the lateral wall 40 has a passage opening 44, and the lateral wall 41 has a coaxial opening 45 which can, for example, be designed in form of a blind hole. Both openings 44 and 45 serve for acceptance of a hinge bolt or pin 20 (FIG. 12).

It is evident from FIGS. 2 and 3 that the hand grip 1 is fastened to a support 4 via a connecting or hinge element 3 and an arresting bolt 15. The support 4 has an opening 5. The connecting element 3 has as stop zone with two oppositely positioned connecting flanges 10 and 11. It is apparent from FIGS. 6 and 7 that the one connecting flange 10 is rigid and the other connecting flange 11 is a resilient elastic element. The rigid connecting flange 10 according to FIGS. 5 and 6 has a groove 24 which is located in the posterior zone and which is adjusted with respect to its width to the thickness of the support. Analogous to groove 24, the elastic connecting flange 11 has a contact shoulder 22 and, opposite said shoulder, a contact surface 23. Both flanges 10 and 11 are designed to converge conically toward the anterior zone as an aid to installation.

It is apparent from FIG. 2 that the groove 24 of the rigid connecting flange 10 has embedded itself in the support 4 behind the opening 5 and that, positioned opposite said embedment, the elastic connecting flange 11, with its contact shoulder 22 in spread position S, acts upon one side of the support 4 with the aid of an arresting bolt 15 and with contact surface 23 acts upon the other side of the support. Thus, with the arresting bolt 15, the storage part 3 is securely fastened in the opening 5 of support 4.

The hand grip 1, schematically represented in FIG. 2 in lateral view in position of rest R (or non-use), can be moved to a swivel position A (use position) represented in FIG. 3. To that end, the hand grip 1 rotates in counterclockwise direction around the hinge bolt 20 which penetrates passage holes 37 and 38 in hinge locations 8 and 9 of the respective hinge part and which is embedded in the openings 44 and 45 of the lateral walls 40 and 41 of the end zones 2 or 2' of hand grip 1.

Each end zone of the hand grip 1 has an upper contact shoulder 31 and a lower convex stop zone 32 located in the area of the end zones 2, 2' which frontally, in the position A', acts upon a counter surface 33 of storage part 3 with the hand grip folded up according to FIG. 3. The hinge part 3 has, at the side facing away from the hand grip elements 10, 11, a corresponding stop zone 30 in order to limit the rotation of the hand grip 1.

In the rest position R, shown in FIG. 2, the stop shoulder 31 of hand grip 1 acts upon the upper zone of hinge part 3, and the lower, convex stop zone partially covers the lower zone of the hinge part 3.

In the folded-out or in-use position A, shown in FIG. 3, the stop shoulder 31 of hand grip 1 lies free, and the convex stop zone 32 covers the posterior lower zone of hinge part 3. Here, the counter surface 33 of hinge part 3 is effective which is acted upon by the front surface of the convex stop zone 32 of hand grip 1. Thus, the hand grip, in its swivel position A, is made absolutely secure against further turning.

Figure 7:
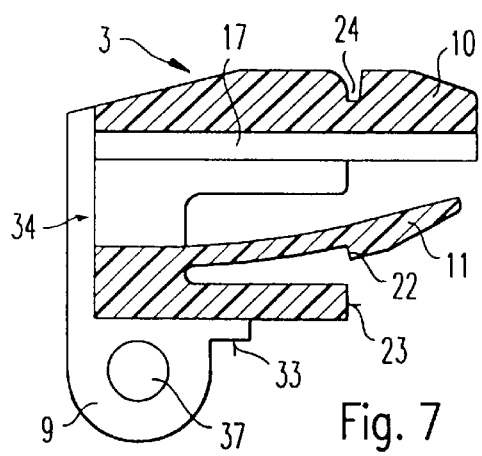
FIG. 7 is a center section through the hinge part according to FIG. 6.
Figure 8:
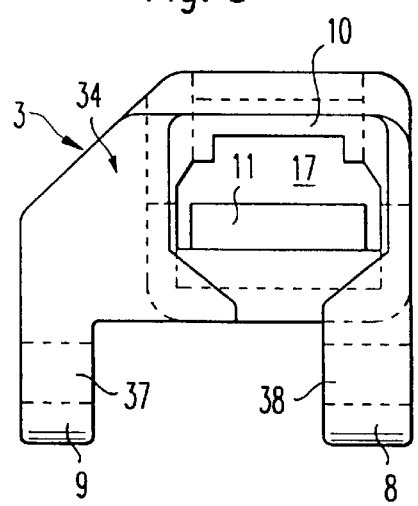
FIG. 8 is a front view of the hinge part according to FIGS. 6 and 7.
Figure 9:
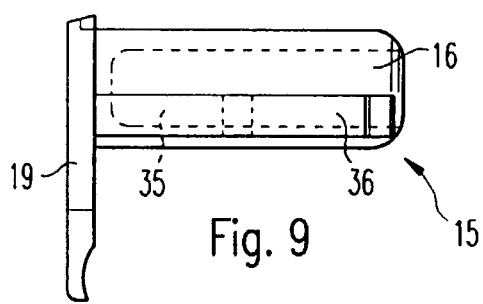
FIG. 9 is a lateral view of the arresting bolt.
Figure 11:
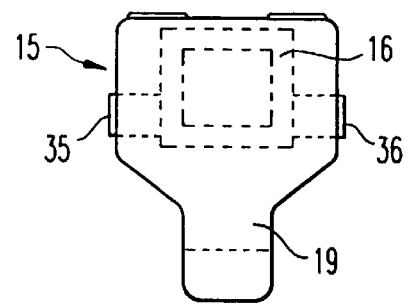
FIG. 11 is a front view of the arresting bolt.
Figure 10:
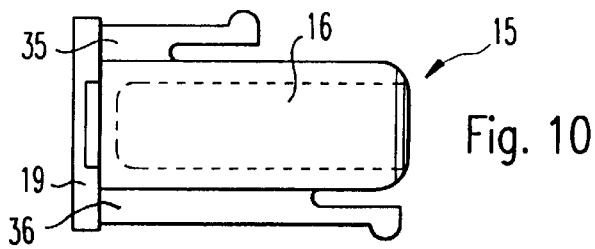
FIG. 10 is a plan view of the arresting bolt according to FIG. 9.

It is apparent from FIGS. 6, 7, and 8 that the hinge part 3 has between the rigid contact flange 10 and the elastic contact flange 11, a rectangular passage opening 17. The cross section of this passage opening is adapted to an arresting bolt 15, shown in FIGS. 9, 10, and 11.

Below the rectangular passage opening 17, the hinge part 3 has two hinge locations 8 and 9 with passage openings 37 and 38 for penetration of the hinge bolt 20.

It is apparent from FIG. 8 that hinge part 3 is designed, in each instance, asymmetrically and has a configuration which makes it possible to be fitted into the recess 25 of the respective end zone 2 or 2' of the hand grip 1.

The arresting bolt has a main body 16 which is rectangular in cross section and which can be inserted into the passage opening of hinge part 3. A hole extends into the main body 16. It is preferably designed as a blind hole in order to have sufficient elasticity.

At the end, the main body 16 of the arresting bolt 15 is equipped with a cover plate 19 which can be placed against the posterior zone 34 of hinge part 3. On the long side of the main body 16, the arresting bolt has, on each side, an elastic stopping tongue 35 and 36 which can be embedded into a counter stopping device of hinge part 3. It is apparent from FIG. 10 that the arresting tongues 35 and 36 can have different lengths. The hinge part 3 has, in the lateral zone, corresponding counter stop devices which engage behind the elastic stop tongues 35 and 36 of the arresting bolt 15 in closed position S.

It is obvious from FIG. 12 that the hinge bolt 20 which penetrates the openings 44 and 45 of the end zone 2 or 2' of the hand grip 1 and the hinge locations 8 and 9 of the hinge part 3 is surrounded by a spiral spring 21 which supports itself on the one side on the cross piece 42 of the end zone 2 or 2' of hand grip 1 and, on the other side, acts upon the posterior zone 34 of hinge part 3. Because of spring 21, there is the guaranty that, in case of need, after release of hand grip 1 in position A, it returns from its swivel position A to the rest position R depicted in FIG. 2.

In order to attenuate this return movement to position R, there is provided a schematically represented rotation damper 60' acting against spring 21. As a result, the swivel movement of the hand grip is decelerated either through a viscous medium or a damping material.

FIGS. 4 and 5 indicate the installation of the hand grip 1 at the support 4. In these showings, hand grip 1 is already attached to the hinge part 3 by means of the hinge bolt 20 and the spiral spring 21. The arresting bolt 15, according to FIG. 4, is inserted with its main body 16, over a short distance, in the passage opening 17 of hinge part 3. The elastic contact flange 11 is in its position of rest so that it is possible to insert the hinge part 3 into the opening 5 of the support.

If such insertion has taken place according to FIG. 5, then the groove 24 of the rigid contact element 10 positions itself behind the support opening 4 and the stop surface 23 acts upon the support 4 on the opposite side. Now, the arrest bolt 15 can be fully inserted into the passage opening 17 in the direction of arrow I until it is in the position according to FIG. 2 or FIG. 3, respectively.

In that position, the elastic connecting flange 11 is in spreader position S, in other words, the contact shoulder 22 acts upon the side of the support 4 which is opposite the contact surface 23. Thus, according to FIGS. 2 and 3, the hand grip is attached functionally secure to the support 4 and can swivel between the positions R and A. In mounted position, the cover plate 19 of the arresting bolt 15 lies against the posterior zone 34 of storage part 3 so that there results a unit which is closed in itself which does not impede the swivel movement of the hand grip 1.

The special design of the hand grip according to the invention results in rapid and functionally secure installation whereby, in addition, a compact arrangement is achieved through swivel motion of the hand grip.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A hand grip assembly comprising:
    a hand grip member having two end zones disposed on opposite ends of the hand grip member, each of the two end zones carrying an elongate hinge bolt;
    a pair of hinge members for pivotally connecting the end zones of the hand grip member to an operatively associated support opening, each of the hinge members having hinge locations on a first end thereof adapted to pivotally engage a respective one of the hinge bolts carried by the two end zones;
    a pair of locking devices formed on second ends of the pair of hinge members opposite said first ends, each of the locking devices including first and second connecting flanges extending from a respective second end of the hinge member on opposite first and second sides of a passage opening defined by the hinge members, the pair of locking devices being arranged to grasp behind the support opening and to be held in a spread apart position by an arresting bolt selectively slidable in said passage opening, the first connecting flange being elastic and the second connecting flange being rigid and less resilient than the first connecting flange, the first elastic connecting flange being adapted to grasp behind said support opening and engage a first surface of the support opening on a back side of the support opening opposite said pair of hinge members when the first connecting flange is held in said spread apart position by said arresting bolt and the second rigid connecting flange including a groove adapted to engage a second surface on said back side of the support opening and a third surface on a front side of the support opening opposite said back side; and, a contact member extending from each of the pair of locking devices adjacent said first connecting flange, each contact member being adapted to engage said front side of said support opening.

2. The hand grip assembly according to claim 1 wherein the first elastic connecting flange is arranged on the locking device between said contact member and the second rigid connecting flange.

3. The hand grip assembly according to claim 1 wherein:

the first elastic connecting flange and the contact member form opposed a contact surfaces arranged to contact the support opening on respective opposite back and front sides; and, the second rigid connecting flange includes a groove having a thickness corresponding to a thickness of the support opening.

4. The hand grip assembly according to claim 1 wherein said pair of hinge members each include at least one stop zone formed on the first end thereof adjacent said hinge locations for limiting rotary movement of the hand grip member.

5. The hand grip assembly according to claim 4 wherein each end zone of the hand grip members includes a storage portion defining an upper stop shoulder and a lower, convex stop zone, the convex stop zone frontally selectively engaging a counter surface on the hinge members when the hand grip member is disposed in a folded-up position relative to the hinge members.

6. The hand grip assembly according to claim 4 wherein each end zone of the hand grip member includes a recess adapted to receive a posterior zone of the respective hinge member equipped with a stop zone.

7. A hand grip assembly according to claim 6 wherein:

the recess passes over into the convex stop zone; and, the stop zone includes a frontal surface that acts upon a counter surface of the hinge member when the hand grip member is in said folded up position.

8. The hand grip assembly according to claim 1 wherein:

the arresting bolt has a main body that is rectangular in cross section and a rectangular passage opening is formed in the pair of hinge members for receiving the main body of the arresting bolt.

9. The hand grip assembly according to claim 8 wherein the end of the main body of the arresting bolt is equipped with a cover plate adjacent to a posterior zone of the hinge member.

10. The hand grip assembly according to claim 8 wherein the main body of the arresting bolt has elastic stop tongues.

11. The hand grip assembly according to claim 10 wherein the stop tongues have different lengths relative to each other.

12. The hand grip assembly according to claim 1 wherein said elongate hinge bolt is operatively swivel connected to the hand grip member by an attenuating rotation damper.

\* \* \* \* \*